United States Patent [19]

Spillman et al.

[11] Patent Number: 5,631,102
[45] Date of Patent: May 20, 1997

[54] SEPARATOR INSERT FOR ELECTROCHEMICAL CELLS

[75] Inventors: David M. Spillman, Tonawanda; Esther S. Takeuchi, East Amherst, both of N.Y.

[73] Assignee: Wilson Greatbatch Ltd., Clarence, N.Y.

[21] Appl. No.: 598,615

[22] Filed: Feb. 12, 1996

[51] Int. Cl.⁶ .................. H01M 2/18; H01M 6/14
[52] U.S. Cl. .................. 429/94; 429/131; 429/142; 429/194; 429/254
[58] Field of Search .................. 429/130, 131, 429/142, 144, 129, 94, 194, 218, 254

[56] References Cited

U.S. PATENT DOCUMENTS

| | | | |
|---|---|---|---|
| 3,201,280 | 8/1965 | Yumoto | 429/131 |
| 4,629,666 | 12/1986 | Schlaikjer | 429/194 |
| 4,663,253 | 5/1987 | Simonton et al. | 429/129 |
| 4,740,433 | 4/1988 | Lu | 429/94 |
| 4,849,144 | 7/1989 | McLoughlin | 264/45.9 |
| 4,910,106 | 3/1990 | Kafchinski et al. | 429/254 |
| 5,389,463 | 2/1995 | Chang et al. | 429/142 |
| 5,415,959 | 5/1995 | Pyszczek et al. | 429/249 |
| 5,435,874 | 7/1995 | Takeuchi et al. | 156/242 |

Primary Examiner—Anthony Skapars
Attorney, Agent, or Firm—Hodgson, Russ, Andrews Woods & Goodyear LLP

[57] ABSTRACT

A separator insert used in addition to the main separator in an electrochemical cell, is described. A preferred material for the separator insert is a woven or nonwoven fluropolymeric material such as tetrafluoroethylene-ethylene copolymer (PETFE). This polymeric material is chemically inert to the components used in alkali metal cells, is corrosion resistant and does not decompose at normal battery temperatures. Preferably, the separator insert covers at least each side of the cathode means in a spirally wound electrode stack and extends less than one-half the total length thereof. This provides additional protection against internal short circuit conditions due to tearing or puncture of the traditional separator cause by exposed electrode screens.

22 Claims, 2 Drawing Sheets

SEPARATOR INSERT FOR ELECTROCHEMICAL CELLS

BACKGROUND OF THE INVENTION

1. Field of the Invention

This invention relates generally to electrochemical cells and more particularly to a new and improved separator structure useful in an electrochemical cell having an anode, a depolarizer/liquid catholyte or a solid cathode/electrolyte system. Still more particularly, the present invention relates to the use of a separator structure in addition to the traditional or main separator in a spirally wound cell configuration. The separator structure of the present invention is provided to augment the primary or main separator disposed between the anode and the cathode electrodes to further help prevent internal electrical short circuit conditions from occurring.

2. Prior Art

In addition to providing a physical barrier between the anode and the cathode, the separator is usually porous in nature, provides high ionic conductivity and exhibits extremely high electrical resistivity. Presently, various types of woven or nonwoven paper, fiberglass, microporous materials and the like meet these criteria and are used as separator materials by those skilled in the battery art. However, many of the separator materials that are used in alkali metal electrochemical cells have very low tensile strength, especially when wetted with the electrolyte or catholyte material. Furthermore, when wetted, many of the separator materials become increasingly susceptible to tearing and puncture.

These latter characteristics can lead to internal short circuit conditions, especially in cells containing a spirally wound cell structure having the anode and cathode assemblies tightly wound at the center of the electrode stack. Because of the tight curvature of the electrodes, this area contains a relatively large degree of stress in comparison to the remaining portion of the wound electrode assembly. Generally, this centered area of high stress is limited to the first one inch length of the innermost electrode. Additionally, small areas of exposed electrode screen can sometimes be left uncovered by the electrochemically active anode or cathode materials. The exposed screen can have sharp edges or points often located at the leading edge of the electrode. The separator material can be weakened by the wetting electrolyte and is susceptible to tearing in this area where higher mechanical stresses occur. As such, the separator at the center region of the spirally wound electrode stack is susceptible to puncture by sharp strands of exposed electrode screen.

Besides maintaining an acceptable tensile strength even when wetted with an electrolyte, there are several other requirements which a suitable separator material must exhibit to be used in an electrochemical cell or battery. It must be chemically inert, resist corrosion and be able to withstand high temperatures for the intended application of the cell or battery. While woven and nonwoven fabrics, fiberglass, microporous materials and the like exhibit many of these features, many polymeric materials have also been demonstrated to be candidate separator materials. Particularly, tetrafluoroethylene-ethylene copolymer (PETFE) has been described in U.S. Pat. No. 5,415,959 to Pyszczek et al., which is assigned to the assignee of the present invention and incorporated herein by reference, as a material which is chemically inert to the battery materials used in alkali metal cells, is corrosion resistant and does not decompose at any temperature which the alkali metal cell or battery could be expected to remain operational. Additionally, PETFE is extremely resistant to tearing and puncture.

Although PETFE can be used as the sole separator in electrochemical cells or batteries and particularly alkali metal cells or batteries, the application of this material as a separator has drawbacks when applied in practice. The material is not as ionically conductive as the woven and nonwoven fabrics and fiberglass materials, and the relatively high cost associated with PETFE can substantially increase the cost of an electrochemical cell or battery.

SUMMARY OF THE INVENTION

The present invention relates to the use of a woven or a nonwoven separator insert provided between the anode and cathode electrodes in addition to the primary separator. The separator insert is at least as wide as the electrode which it covers and can be up to several inches in length. In a spirally wound electrode stack intended for housing inside a conductive casing in a case-negative configuration, the solid cathode or the current collector in a liquid catholyte system, is positioned radially inside of the anode electrode. In either case, the separator insert is preferably placed around the leading edge of the cathode or the depolarizer assembly so as to provide additional protection at the beginning of the wound electrode stack. The separator insert preferably covers each side of the cathode or the depolarizer assembly and extends less than one-half the total length thereof. Thus, the separator insert provides additional protection against internal short circuit conditions due to tearing of the traditional separator or puncture caused by exposed electrode current collector screens.

The preferred material for the separator insert of the present invention is a fluoropolymeric material, and more preferably PETFE. This material is preferred due to its inert nature, corrosion resistance, ability to withstand chemical breakdown and high tensile strength.

These and other aspects of the present invention will become increasingly more apparent to those of ordinary skill in the art by reference to the following description taken in conjunction with the accompanying drawings.

DETAILED DESCRIPTION OF THE INVENTION

Figure 1:
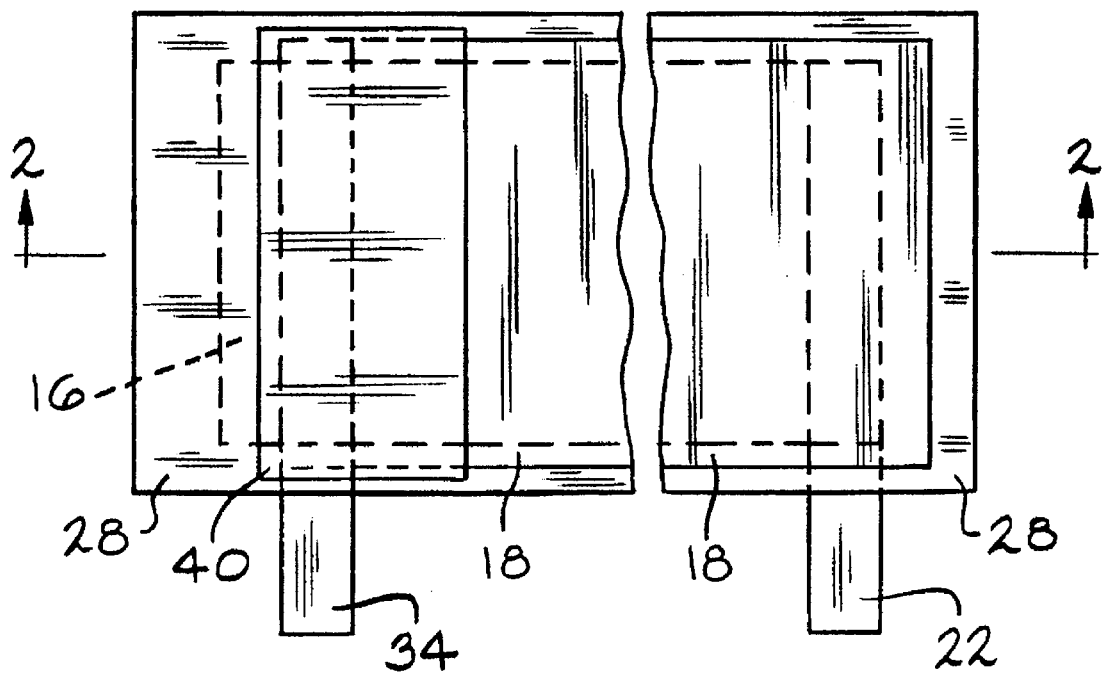
FIG. 1 is a broken, side elevational view, partly in phantom, of an anode electrode 16 positioned side-by-side with a cathode electrode 18 wherein a separator insert 40 according to the present invention covers the leading edge and both sides of the cathode electrode.
Figure 2:
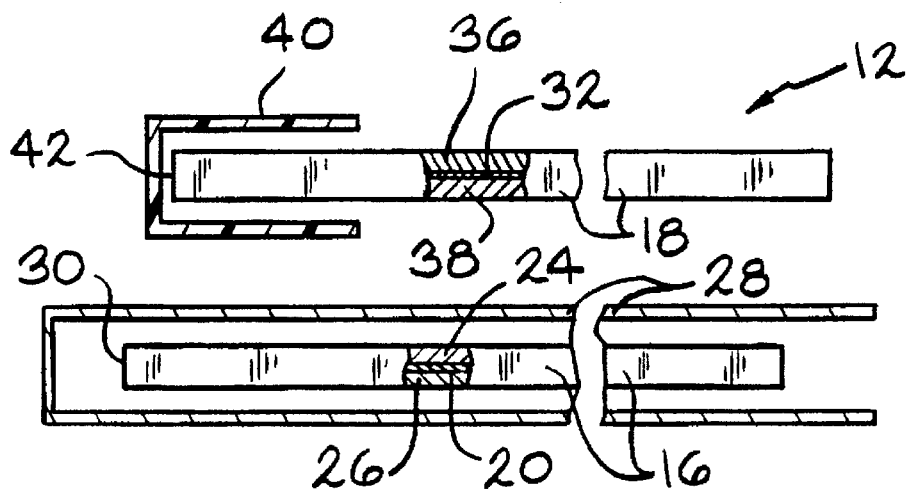
FIG. 2 is a cross-sectioned view taken generally along line 2—2 of FIG. 1.
Figure 3:
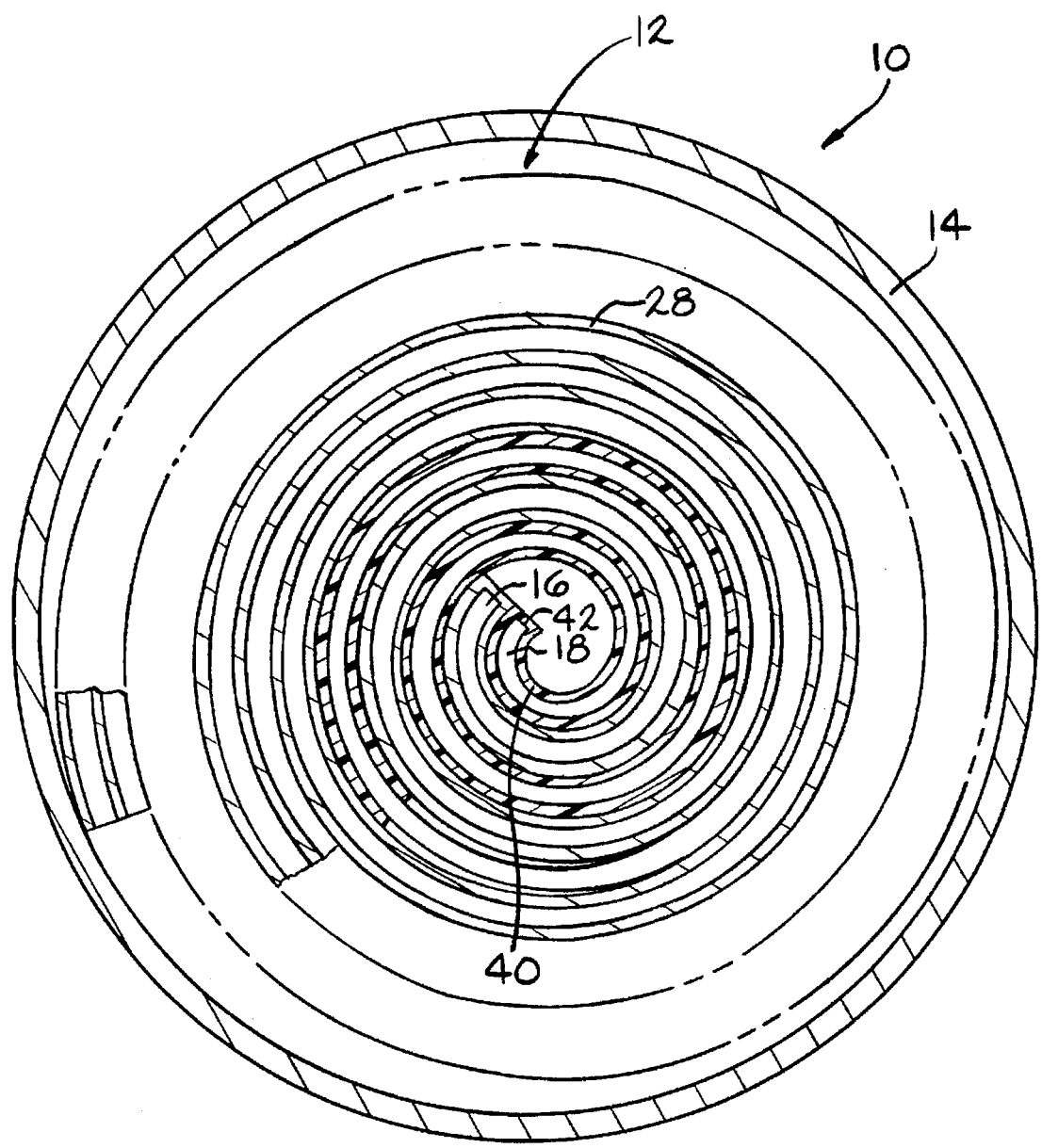
FIG. 3 is a plan view of a spirally wound electrode stack 12 according to the present invention disposed inside of a casing 14.

Referring now to the drawings, FIG. 3 shows an exemplary electrochemical cell 10 having a cylindrically shaped spirally wound electrode stack 12 (partially shown in dashed lines) housed inside of a casing 14. FIGS. 1 and 2 show the electrode stack 12 prior to being rolled into the spirally wound configuration including an anode electrode 16 positioned side-by-side with a cathode electrode 18. The anode electrode 16 comprises an elongated continuous ribbon-like anode conductor element or current collector 20 in the form of a thin metal screen, for example, nickel. Anode current collector 20 includes at least one terminal or contact tab 22 extending therefrom. The anode electrode 16 further comprises a pair of elongated ribbon-like anode active elements 24 and 26 pressed together against opposite sides of the current collector 20 to form the anode electrode 16. The resulting anode electrode 16 is a sandwich-like structure with the current collector 20 disposed between the anode active elements 24, 26. For example, the anode active material may be a metal selected from Group IA of the Periodic Table of the Elements, including lithium, sodium, potassium, etc., and their alloys and intermetallic compounds including, for example, Li—Si, Li—Al, Li—B, Li—Mg, Li—Al—Mg, and Li—Si—B alloys and intermetallic compounds. In that case, the anode active elements 24, 26 preferably comprise lithium.

The anode electrode 16 further comprises separator material 28 surrounding the anode structure. In particular, the anode electrode comprising current collector 20 and anode elements 24, 26 is enclosed or wrapped in a single layer or sheet of separator material 28 folded to cover the leading edge 30 and extending along both sides of the anode electrode 16. If the electrochemical cell 10 is intended to power implantable medical devices such as a cardiac defibrillator (not shown), the separator sheet 28 is preferably heat sealed around the edges, as is well known to those skilled in the art. By way of example, in an alkali metal cell separator 28 is a single layer of Pellon 2107 0.008 inch thick polypropylene non-woven separator material.

The electrochemical cell of the present invention further comprises the cathode electrode 18 having a cathode conductor or current collector 32 including a lead portion 34. The conductor portion of the cathode current collector 32 is in the form of a thin sheet of metal screen, for example, titanium, stainless steel or nickel, and lead portion 34 is in the form of a solid thin tab extending from one side of the screen. Cathode electrode 18 further comprises cathode plates 36, 38 formed from a free-standing sheet of a cathode active mixture which can include a cathode active material and binder, as is well known to those skilled in the art.

In the case of an alkali metal/solid cathode electrochemical cell, suitable cathode active materials include a metal, a metal oxide, a mixed metal oxide, a metal sulfide and carbonaceous materials, and mixtures thereof. Examples of electrode active materials that may be formed into a solid cathode component according to the present invention include carbon, fluorinated carbon, silver vanadium oxide, copper silver vanadium oxide, copper vanadium oxide, manganese dioxide, cobalt oxide, nickel oxide, copper oxide, iron sulfide, iron disulfide and others. Such solid cathode active materials may be pressed into a cathode pellet with the aid of a suitable binder material such as a fluororesin powder, preferably polytetrafluoroethylene (PTFE) powder, and a material having electronic conductive characteristics such as graphite and/or carbon black. In some cases, no binder material or electronic conductor material is required to provide a similarly suitable cathode active structure. Further, some of the cathode active materials described above may also be prepared by rolling, spreading or pressing a mixture of the solid materials mentioned above onto a suitable current collector such as Exmet wire mesh.

Or, the electrochemical cell can comprise a depolarizer/catholyte such as sulfur dioxide or oxyhalides including phosphorize chloride, thionyl chloride and sulfuryl chloride, used individually or in combination with each other or in combination with halogens and interhalogens, such as bromine trifluoride, or other electrochemical promoters or stabilizers. In the case of a liquid catholyte system, such as the Li/BrF$_3$ or the Li/CSC (lithium/chlorinated sulfuryl chloride) system, the depolarizer cathode plates 36, 38 are comprised of high surface area carbonaceous material formed from a carbon black/PTFE mixture formed into a free-standing sheet in a manner similar to that described in U.S. Pat. No. 5,435,874 to Takeuchi et al., which is assigned to the assignee of the present invention and incorporated herein by reference. After preparation of the free-standing cathode active sheet, the cathode plates 36, 38 are cut from the sheet and calendared onto the screen portion of the cathode current collector 32 to form the depolarizer electrode 18. In either case, i.e., the solid cathode or the carbonaceous depolarizer, the resulting cathode electrode 18 is a sandwich-like structure with the current collector 32 disposed between the plates 36, 38.

The exemplary cell 10 of the present invention further includes a separator insert 40 to augment the physical separation between the anode and cathode active electrodes. The separator insert 40 is of electrically insulative material to prevent an internal electrical short circuit between the electrodes, and the separator insert material also is chemically unreactive with the anode and cathode active materials and both chemically unreactive with and insoluble in the electrolyte. In addition, the separator insert material has a degree of porosity sufficient to allow flow therethrough of the electrolyte during the electrochemical reaction of the cell. The separator insert 40 is at least as wide as the one electrode which it covers. In FIG. 1, the separator insert 40 is shown covering the cathode electrode 18 but that is not necessary. What is necessary according to the present invention is that the separator insert 40 cover the leading edge 42 and at least one side of one of the electrodes in the cell. For example, the separator insert 40 is shown in the figures extending along the cathode electrode 18 for at least some portion of its length, generally less than one-half of the length of the electrode. In a preferred form of the present invention, the separator insert 40 is placed around the leading edge 42 and a portion of the two sides of the cathode electrode 18 to provide additional short circuit protection when the anode electrode 16 and cathode electrode 18 are subsequently rolled or otherwise formed into the spirally wound electrode stack 12 (FIG. 3).

Illustrative materials for the main separator 28 and the separator insert 40 include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.). Other materials that are useful as the main separator 28 and that are particularly useful as the separator insert 40 of the present invention include woven fabric separators comprising halogenated polymeric fibers, as described in the previously referenced U.S. Pat. No. 5,415,959 to Pyszczek et al. Fabric separators made from halogenated polymeric fibers are tear resistant, chemically unreactive and are electrically insulative to prevent internal electrical short circuit conditions between the electrode components in the cell. Such woven fabric separators are also chemically unreactive and insoluble in the electrolyte solution. In addition, woven fabric separators of halogenated polymeric fibers have a high degree of porosity that is sufficient to allow flow therethrough of the electrolyte solution during the electrochemical reaction of an anode/solid cathode cell system or to allow for flow therethrough of the catholyte in an anode/depolarizer system.

Examples of halogenated polymeric materials suitable for the main separator 28 and particularly for the separator insert 40 of the present invention include, but are not limited to, tetrafluoroethylene-ethylene copolymer (PETFE) which is commercially available under the name Tefzel, a trademark of the DuPont Company; chlorotrifluoroethylene-ethylene copolymer which is commercially available under the name Halar, a trademark of the Allied Chemical Company and polyvinylidene fluoride.

It should be understood that while the separator insert 40 of the present invention is particularly advantageous when used in a wound element cell stack or "jellyroll" configuration, the separator insert is also useful with other electrochemical configurations. For example, when the anode is folded in a serpentine-like structure with a plurality of cathode plates disposed intermediate the anode folds and received in a cell casing, the separator insert of the present invention is useful to augment the main separator when it is placed to cover the leading edge of a cathode plate disposed at the trough of the anode folds. What is important is that the separator insert 40 provides additional protection against internal short circuit conditions due to tearing or puncture of the traditional or main separator by exposed electrode current collector screens.

An electrochemical cell including a separator insert 40 according to the present invention is preferably activated with an ionicly conductive electrolyte operatively associated with the anode and the cathode electrodes. The electrolyte serves as a medium for migration of ions between the anode and the cathode during the electrochemical reactions of the cell. In the case of an alkali metal/solid cathode electrochemical cell, the electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides. Suitable nonaqueous solvents are chosen so as to exhibit those physical properties necessary for ionic transport (low viscosity, low surface tension and wettability). Thus, in the case of an anode comprising lithium, the alkali metal salt of the electrolyte preferably comprises lithium hexafluoroarsenate ($LiAsF_6$), lithium hexafluoroantimonate ($LiSbF_6$) or lithium hexafluorophosphate ($LiPF_6$) dissolved in a 50/50 solvent mixture (by volume) of propylene carbonate (PC) and dimethoxyethance (DME).

In the case of an alkali metal-depolarizer/catholyte cell, such as lithium oxyhalide cells, suitable catholytes include thionyl chloride, sulfuryl chloride, chlorinated sulfuryl chloride (CSC), thionyl chloride-bromine chloride (BCX), and mixtures thereof having an alkali metal salt dissolved therein. Thus, for a lithium anode, the alkali metal salt of the catholyte comprises $LiBF_4$, $LiClO_4$, $LiAlCl_4$, $LiGaCl_4$, $LiCF_3SO_3$, and mixtures thereof.

As previously discussed, the preferred form of the cell assembly for which the separator insert 40 of the present invention is particularly useful is referred to as a spirally wound electrode stack 12 (FIG. 3). That is, the fabricated cathode, anode, main separator and the separator insert 40 preferably associated with the cathode, are wound together in a "jellyroll" end type configuration or "wound electrode cell stack" such that the anode electrode 16 is on the outside of the roll to make electrical contact with the cell case 14 in a case-negative configuration. Using suitable top and bottom insulators (not shown), the wound cell stack is inserted into the metallic case of a suitable size dimension. The metallic case may comprise materials such as stainless steel, mild steel, nickel-plated mild steel, titanium or aluminum, but not limited thereto, so long as the metallic material is compatible for use with components of the cell.

While not shown in the drawings, those skilled in the art will readily understand that the casing is provided with a cell header comprising a metallic disc-shaped body with a first hole to accommodate a glass-to-metal seal/terminal pin feedthrough and a hole for electrolyte filling. The glass used is a corrosion resistant type, for example, having from between about 0% to about 50% by weight silicon such as CABAL 123, TA 23, CORNING 9013 or FUSITE 425 or FUSITE 435. The positive terminal pin feedthrough preferably comprises titanium although molybdenum and aluminum, such as an aluminum 52 alloy pin, can also be used. The cell header comprises elements having compatibility with the other components of the electrochemical cell and is resistant to corrosion. The cathode lead 34 is welded to the positive terminal pin in the glass-to-metal seal and the header is welded to the case containing the electrode stack.

The cell is thereafter filled with the electrolyte described hereinabove and hermetically sealed such as by close-welding a stainless steel ball over the fill hole, but not limited thereto. This above assembly describes a case-negative cell which is the preferred construction of the cell of the present invention having the separator insert associate with one of the electrodes, preferably the cathode electrode, as described above. Such is typically the case in a lithium/silver vanadium oxide cell provided in a spirally wound configuration with the separator insert covering the leading edge and a portion of both sides of the mixed metal oxide cathode. This cell is particularly adapted for use as a high rate cell capable of being pulse discharged, such as is required during device activation of an implantable cardiac defibrillator and the like. As is well known to those skilled in the art, the exemplary electrochemical system of the present invention can also be constructed in a case-positive configuration.

The electrochemical cell of the present invention operates in the following manner. When the ionicly conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms.

The separator insert of the present invention is also not limited to active batteries which are considered to be disposable following the completion of a single discharge of their active components. The separator insert may also be used with secondary electrochemical cells which can be discharged and recharged many times before disposal of the cell becomes necessary and with reserve cell types where the electrical cell is activated when it is to be used.

It is intended that the foregoing description only be illustrative of the present invention and that the present invention is limited only by the hereinafter appended claims.

What is claimed is:

1. An electrochemical cell comprising:
   (a) an anode comprising an anode active material in contact with an anode current collector;
   (b) a cathode comprising an electrode active material in contact with a cathode current collector;
   (c) a separator provided between the anode and the cathode operatively associated with each other, the separator preventing internal electrical short circuit conditions;

(d) a separator insert provided to cover an edge and at least one side of at least one of the anode and the cathode, the separator insert extending along the at least one anode and cathode a distance less than one-half the length thereof to prevent the covered portion of the one current collector in contact with the at least one anode and cathode from tearing through the separator and the separator insert; and (e) an electrolyte activating the operatively associated anode and the cathode.

2. The electrochemical cell wherein the anode and the cathode are operatively associated with each other in a spirally wound configuration and the separator insert covers a leading edge of at least one anode and cathode beginning at a center position of the spirally wound electrode configuration.

3. The electrochemical cell of claim 1 wherein the separator insert covers the cathode.

4. The electrochemical cell of claim 1 wherein the separator insert covers the leading edge and less than one-half of both sides of the cathode operatively associated with the anode in a spirally wound configuration.

5. The electrochemical cell of claim 1 wherein the separator insert comprises a fluoropolymeric material.

6. The electrochemical cell of claim 5 wherein the fluoropolymeric material is selected from the group consisting of polyvinylidine fluoride, tetrafluoroethylene-ethylene copolymer, and chlorotrifluoroethylene-ethylene copolymer, and mixtures thereof.

7. The electrochemical cell of claim 1 wherein the separator insert is either a woven or a non-woven fabric.

8. The electrochemical cell of claim 1 wherein the separator insert comprises a non-woven fabric of tetraflueoroethylene-ethylene copolymer.

9. The electrochemical cell of claim 1 wherein the separator insert comprises a non-woven tetrafluoroethylene-ethylene copolymer fabric that covers the leading edge and less than one-half of both sides of the cathode operatively associated with the anode in a spirally wound configuration.

10. The electrochemical cell of claim 1 wherein the anode is selected from the group consisting of lithium, a lithium alloy, sodium, potassium, calcium and magnesium.

11. The electrochemical cell of claim 1 wherein the cathode is made of a solid material selected from the group consisting of manganese dioxide, carbon, fluorinated carbon, silver vanadium oxide, copper vanadium oxide, copper silver vanadium oxide, titanium disulfide, copper oxide, copper sulfide, iron sulfide and iron disulfide, and mixtures thereof.

12. The electrochemical cell of claim 1 wherein the cathode comprises a liquid selected from the group consisting of sulfur dioxide and/or an oxyhalide including phosphoryl chloride, thionyl chloride and sulfuryl chloride used individually or in combination with each other or in combination with halogens, interhalogens or other electrochemical promoters or stabilizers.

13. In an electrochemical cell comprising: an anode having an anode active material in contact with an anode current collector; a cathode comprising an electrode active material in contact with a cathode current collector; a separator provided between the anode and the cathode operatively associated with each other in a spirally wound configuration, the separator preventing internal electrical short circuit conditions; and an electrolyte activating the operatively associated anode and the cathode, the improvement comprising:

a separator insert covering a leading edge and at least one side of at least one of the anode and the cathode beginning at a center position of the spirally wound electrode configuration and extending along at least one anode and cathode a distance less than one-half the length thereof to prevent the covered portion of the one current collector in contact with the at least one anode and cathode from tearing through the separator and the separator insert, the separator insert in that manner providing additional protection against internal electrical short circuit conditions.

14. The electrochemical cell of claim 13 wherein the separator insert covers less than one-half of the cathode.

15. The electrochemical cell of claim 13 wherein the separator insert comprises a fluoropolymeric material.

16. The electrochemical cell of claim 15 wherein the fluoropolymeric material is selected from the group consisting of polyvinylidine fluoride, tetrafluoroethylene-ethylene copolymer, and chlorotrifluoroethylene-ethylene copolymer, and mixtures thereof.

17. The electrochemical cell of claim 13 wherein the separator insert is either a woven or a non-woven fabric.

18. The electrochemical cell of claim 13 wherein the separator insert comprises a non-woven fabric of tetraflueoroethylene-ethylene copolymer.

19. The electrochemical cell of claim 13 wherein the separator insert comprises a non-woven tetrafluoroethylene-ethylene copolymer fabric that covers the leading edge and less than one-half of both sides of the cathode.

20. The electrochemical cell of claim 13 wherein the anode is selected from the group consisting of lithium, a lithium alloy, sodium, potassium, calcium and magnesium.

21. The electrochemical cell of claim 13 wherein the cathode is made of a solid material selected from the group consisting of manganese dioxide, carbon, fluorinated carbon, silver vanadium oxide, copper vanadium oxide, copper silver vanadium oxide, titanium disulfide, copper oxide, copper sulfide, iron sulfide and iron disulfide, and mixtures thereof.

22. The electrochemical cell of claim 13 wherein the cathode comprises a liquid selected from the group consisting of sulfur dioxide and/or an oxyhalide including phosphoryl chloride, thionyl chloride and sulfuryl chloride used individually or in combination with each other or in combination with halogens, interhalogens or other electrochemical promoters or stabilizers.

\* \* \* \* \*